US005591263A

United States Patent [19]

Chin et al.

[11] Patent Number: 5,591,263

[45] Date of Patent: Jan. 7, 1997

[54] WOOD PRESERVATIVE APPLICATOR

[75] Inventors: Chen-Woo Chin, Wheelers Hill; Christopher N. McEvoy, Mount Martha, both of Australia

[73] Assignee: Saneish Pty Ltd, Victoria, Australia

[21] Appl. No.: 119,102

[22] PCT Filed: Mar. 17, 1992

[86] PCT No.: PCT/AU92/00115

§ 371 Date: Sep. 17, 1993

§ 102(e) Date: Dec. 22, 1993

[87] PCT Pub. No.: WO92/16341

PCT Pub. Date: Oct. 1, 1992

[30] Foreign Application Priority Data

Mar. 18, 1991 [AU] Australia .................................. PK5164

[51] Int. Cl.$^6$ ........................... B05C 11/00; A01G 17/12; B27K 3/14

[52] U.S. Cl. .......................... 118/200; 118/255; 427/440; 47/24; 52/738.1; 206/538

[58] Field of Search .................................... 118/200, 207, 118/255, 76, 412, 506; 422/1; 427/440, 397; 47/24, 24 T; 206/538; 52/727, 300, 738.1

[56] References Cited

U.S. PATENT DOCUMENTS

| | | | |
|---|---|---|---|
| Re. 29,705 | 7/1978 | Compere | 206/538 |
| 2,875,020 | 2/1959 | Ring | 427/440 |
| 2,947,111 | 8/1960 | Zobrist | 47/24 |
| 3,390,951 | 7/1968 | Finger et al. | 47/24 |
| 3,420,617 | 1/1969 | Kimm | 118/200 |
| 4,174,412 | 11/1979 | Tyrer et al. | 427/440 |
| 4,653,644 | 3/1987 | Sullivan et al. | 206/538 |
| 4,779,735 | 10/1988 | Kelso, Jr. | 427/397 |
| 4,908,085 | 3/1990 | Makus et al. | 427/397 |
| 4,988,004 | 1/1991 | Intini | 206/538 |
| 5,138,806 | 8/1992 | Marx et al. | 52/170 |
| 5,162,052 | 11/1992 | Hoffmann et al. | 47/24 |
| 5,236,711 | 8/1993 | Ostby et al. | 427/440 |

FOREIGN PATENT DOCUMENTS

| | | |
|---|---|---|
| 517086 | 6/1981 | Australia . |
| 2397924 | 3/1979 | France . |
| 733502 | 3/1943 | Germany . |
| 886220 | 8/1953 | Germany . |

*Primary Examiner*—Donald E. Czaja
*Assistant Examiner*—Steven P. Griffin
*Attorney, Agent, or Firm*—Jensen & Puntigam, P.S.

[57] ABSTRACT

The invention described is a wood preservative applicator or bandage for wooden structures such as wooden poles which wraps around the pole at ground level. The bandage comprises a inert matrix 2 which has a surface for contact with the wooden structure and has a plurality of reservoirs 3 formed therein. The reservoirs communicate with the surface of the matrix and contain a solid tablet of wood preservative chemical for supply to the matrix surface. The plurality of individual reservoirs are arranged on the flexible matrix to enable the matrix to be shaped to conform to the contour of the wooden structure. The bandage is also provided with a fastening means for securing the matrix in position on the wooden structure. The fastening means is a line of indentations formed above and below the plurality of individual reservoirs. The indentations form complementing male and female members in the matrix such that when the bandage is applied to a wooden structure, the male members of one end of the bandage co-operate with the overlapping female members at the other end of the bandage to secure the bandage to the wooden structure.

19 Claims, 2 Drawing Sheets

WOOD PRESERVATIVE APPLICATOR

TECHNICAL FIELD

Figure 1:
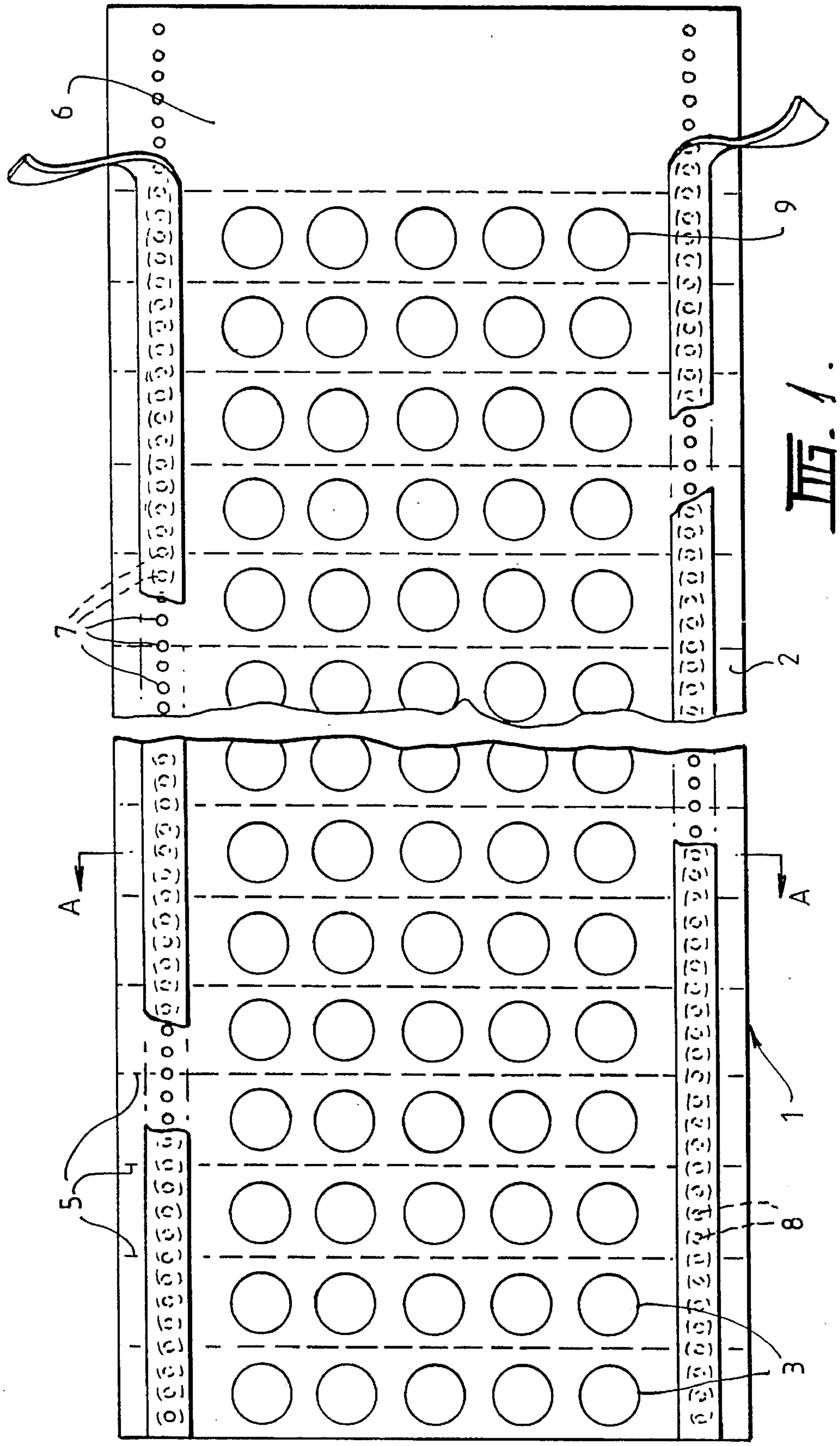

This invention relates to the application of wood preservative chemicals and in particular to the delivery of wood preservative chemicals in a dry form onto the surface of wood structures.

While the invention will be described with reference to wooden poles, it should be understood that, the invention is applicable to all wooden structures which are in contact with soil at ground level.

BACKGROUND ART in Australia, wooden poles make up the majority of poles used as structural Supports for power transmission and telecommunications lines. The service life of poles is greatly reduced by biodegradation processes at ground level caused by fungal decay such as soft rot, white and brown rot and termite attack by damp wood and dry wood termites. Due to the high capital investment involved in these structural poles, and the cost of repairing and replacing these poles, it is therefore desirable to treat the poles in some way to combat biodegradation in wooden poles and greatly increase their service life. It has even been found that poles treated with wood preservative chemicals prior to installation can have a longer service life if they are inspected regularly and given further remedial treatment during the life of the pole.

Known methods for the remedial treatment of wooden poles have involved pouring treatment liquids such as creosote onto the surface of the pole and into the back-fill of the soil. This method has been found to be unsatisfactory as it relies on migration of the treatment chemicals from the soil into the wood and generally requires regular treatments about every two years. This method is further unsatisfactory as most of the chemicals used, leach into the soil away from the pole and do not serve their intended purpose and create an environmental hazard.

The most effective means of controlling fungal decay and termites is to apply a wood preservative containing bandage or applicator. In principle these bandages offer the most direct method of delivering chemicals to the wood whereby the chemical diffuses freely into the wood.

The principle elements required for any biodegradation of wooden structures are moisture (generally above about 20% nutrients and air. Consequently bandages are positioned at ground level as this is where the wood structures are most susceptible to fungal decay and termite attack.

Bandages supplied in rolls with diffusible chemicals bonded as dry powder mix to a weather impermeable sheath have been used in Europe and U.S.A. in addition preservative liquid or paste have been used onto wood structures as remedial treatments. These preservatives are either incorporated into a bandage or applied onto the timber surface by brushing or spraying. As the chemicals are exposed prior to being applied to the pole, users are required to wear protective clothing to avoid contact with the chemicals. This is seen as a disadvantage especially in climatic conditions where protective clothing is uncomfortable to wear. Other bandages have been developed which have been generally cumbersome and difficult to apply thus limiting their appeal to the industry. The ideal bandage should be weatherproof, exclude ground water and not be hazardous to the user, the environment or the general public.

Wood preservative bandages which impregnate an inert matrix with chemical must not only support the chemical but also must be sufficiently thick to be able to contain a satisfactory dosage of chemical. This makes a chemical impregnated bandage difficult to shape to the contours of a wooden structure and apply.

DISCLOSURE OF THE INVENTION

It is an object of the present invention to provide a wood preservative bandage which is safer to apply and more environmentally acceptable.

In accordance with the objectives, the invention provides a wood preservative applicator or bandage for wooden structures comprising a flexible matrix having a surface for contact with the wooden structure, said flexible matrix having formed therein a plurality of individual reservoirs, one or more of said reservoirs containing a solid tablet comprising a wood preserving chemical, said solid tablet contacting directly the wooden structure when said applicator is applied to said wooden structure to supply said wood preserving chemical to said structure, the plurality of reservoirs being arranged on the flexible matrix to enable said matrix to be shaped to conform to the contour of the wooden structure.

As the wood preservative chemical is contained in reservoirs formed in the matrix, the only physical requirement on the flexible matrix is that it supports the chemical reservoirs. Therefore, the matrix can be made from thinner material to the impregnated bandages of the prior art with the consequence that the bandage of the present invention is easier to shape and apply to a wooden structure and is not as cumbersome as prior art bandages.

In a preferred form the reservoirs are closed on the side of the bandage away from the wooden structure. By providing the wood preservative chemical in individual reservoirs in the bandage the problems of the prior art associated with chemical gravitating to the bottom of the bandage is alleviated.

Furthermore, therefore if the matrix is damaged, loss of preservative, only occurs from the damaged reservoirs. Leaching is minimised as only the wooden surface which is in direct contact with the damaged reservoir surface is exposed.

The matrix may be provided with lines of weakness to further assist the shaping of the matrix to the contour of the wooden structure. These lines of weakness are preferably aligned substantially vertically when the matrix is installed on the structure. It is preferable that the matrix is weatherproof and is provided with sealing means above and below the plurality of reservoirs to exclude the entry of water around the peripheries of the bandage.

The fastening means may be a line of indentations formed in the matrix above and below the plurality of reservoirs. The indentations are formed such that the formation of female members on one side of the matrix causes corresponding male members to form on the opposite side of the matrix.

When the bandage is positioned on the wooden structure, one end of the matrix overlaps with the other and the male members of one end co-operate with the female members of the other to secure the bandage in position. The fastening means then also acts as a sealing means for the bandage.

Alternatively, the fastening means may be in the form of a strap or tape which surround the wooden structure and secures the matrix to the pole above and below the plurality of reservoirs.

Figure 2:
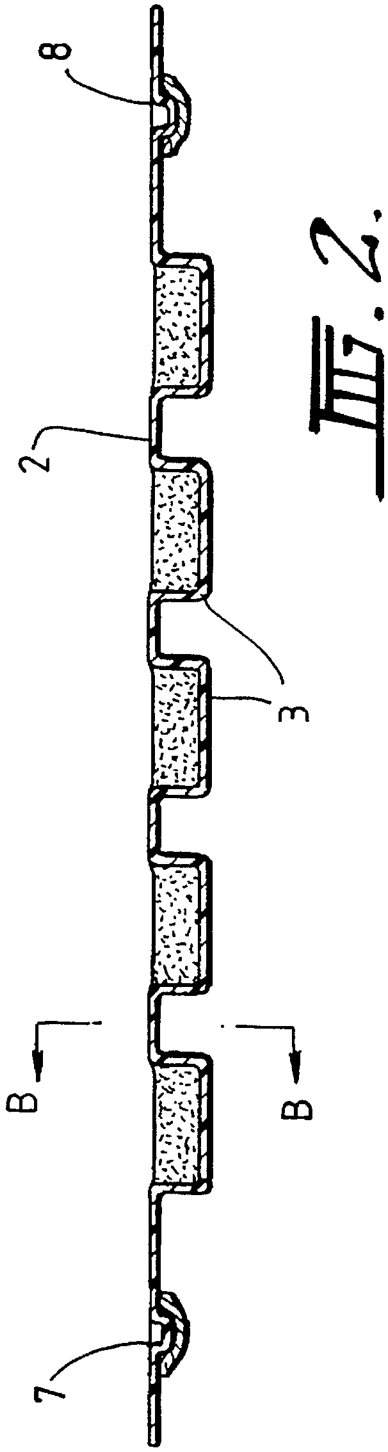
Figure 3:
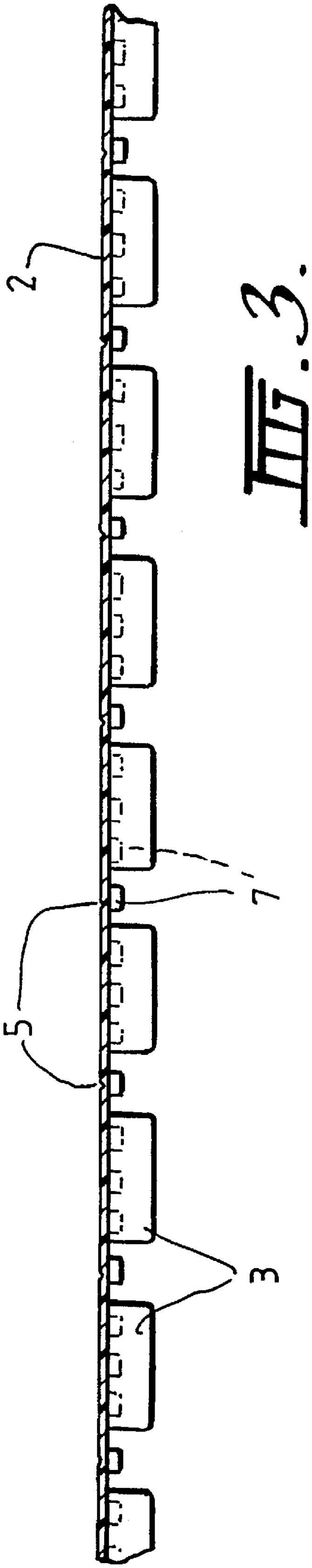

The foregoing and other features, objects and advantage of the present invention will become more apparent from the following description of the preferred embodiment and the accompanying drawing in which:

FIG. 1 is an plan view of a bandage in accordance with the present invention, FIG. 2 is an elevational view of the bandage shown through section A—A of in FIG. 1, AND FIG. 3 is an elevational view of the bandage shown through section B—B of FIG. 2.

BEST MODE OF THE INVENTION in the embodiment of the wood preservative bandage 1 shown in FIG. 1, the flexible inert matrix 2 has a number of chemical reservoirs 3 formed therein. The chemical reservoirs are arranged such that when the matrix is applied to a wooden structure, the reservoirs do not hinder the shaping of the inert matrix. In the preferred form, the reservoirs are formed in the matrix such that the reservoirs extend away from the surface of the matrix in contact with the wooden structure.

The size of the wood preservative bandage will depend on the wooden structure intended to be treated. It is considered that for most wooden poles the reservoirs will be provided over about 1 to 1.5 meters of the inert matrix. The matrix has a leading edge of one column of unfilled reservoirs. When the bandage is wrapped around a pole the leading edge is clipped onto the back of the filled reservoirs at the opposite end of the bandage. This prevents water from entering through the end of the bandage. The embodiment shown in FIGS. 1 to 3 shows a wood preservative bandage which is 5 reservoirs wide. For a standard wooden pole for supporting power transmission and telecommunication lines, a wood preservative bandage which has reservoirs provided over an area of 100 cm×20 cm is used. The preferred reservoirs are about 16 mm in diameter and 8 mm deep and are arranged in a pattern of 42 reservoirs long and 8 rows wide. Reservoirs may be of other sizes and shapes and preferably able to hold a volume of between 500 to 1000 cc of dry chemical. This arrangement allows for even distribution of the chemical to the treated wood surface.

As an alternative to providing the wood preservation bandage in predetermined lengths, the bandage may be produced in continuous rolls and the rolls cut to the required size as they are being applied.

To form the reservoirs 3, the matrix 2 which is a sheet of thermoplastic material is heated and subjected to a conventional vacuum forming operation. These reservoirs then act as moulds for the wood preservative chemical. A wood preservative chemical is provided at an elevated temperature which ensures adequate flowability into the reservoirs. The wood preservative chemical may comprise any water soluble or diffusible fungicide and insecticide but is preferably a mixture of boron compounds, such as, disodium octoborate tetrahydrate with or without fluoride compounds such as sodium fluoride to form a watery paste.

Starting at one end of the bandage illustrated in FIG. 1, between 0.5 and 1.5 kg of the paste, preferably 0.8 kg is poured into the reservoirs. To ensure that the reservoirs of the matrix are full, the paste material is allowed to set slowly in an elevated controlled room at about 30° C. The bandage is then stored in a cold room at a temperature of about 5° C. to allow complete solidification of the paste.

To assist installation to a wooden structure, the matrix may be further provided with lines of weakness 5 formed between the columns of the reservoirs. Lines of weakness may be formed by scoring a line in the matrix thereby making the matrix thinner and easier to bend at that point.

To maintain position on the wooden structure, the bandage may be provided with a line of indentations 7,8 respectively above and below the array of reservoirs. The indentations are drawn or stamped into the matrix to provide a male extension on one side of the matrix and a corresponding female formation on the other. Once the bandage is positioned encircling the wooden structure, the lines of indentations overlap upon themselves. The overlapping male extensions are then pressed into the female formations to maintain the position of the bandage on the wooden structure. Additionally, the leading edge 9 with a column of untilled reservoirs is clipped into position onto the back of filled reservoirs at the opposite end of the bandage.

However, to prevent water entering from the above and below the array of reservoirs, as an alternative to or in conjunction with the line of indentations has been found useful to provide straps or tapes (not shown) to secure the upper and lower bandage seals onto the pole.

While it is preferable for the flexible matrix to protect the wood preservative chemicals from the effects of the weather, a weather cover may be provided around the installed matrix for weather protection.

The bandage is installed at the ground level of the wooden structure because this is the area of the structure most susceptible to fungal attack. At the ground level of the wooden structure, there is sufficient moisture within the wood to allow migration of the chemicals, contained in the reservoirs, to the surface of the wood. Furthermore, the moisture is absorbed by the wood preservative chemicals in the reservoirs causing the dry chemical to swell and providing a back pressure in the reservoirs to further assist the migration of chemicals to the surface of the wood. The treatment chemicals then slowly diffuse into the wood to destroy both the fungal organisms and termites present and prevent further infestation until the chemicals are exhausted.

After installation of the bandage to a wooden structure a further back pressure may be provided by compacting the soil back-fill around the bandage. As the chemicals are absorbed into the wooden structure, the reservoirs collapse under the effects of the soil back pressure thereby maintaining the contact between the chemicals and the wooden structure. Once the chemicals are exhausted, which is usually after 3–5 years, the bandage is replaced.

We claim:

1. A wood preservative applicator bandage for a wooden structure comprising a flexible matrix having a surface for contact with the wooden structure, said flexible matrix having formed therein a plurality of individual reservoirs, one or more of said reservoirs each containing a solid tablet of at least one wood preserving chemical, solidified within, and substantially filling, said one or more reservoirs, said solid tablet contacting directly the wooden structure when said applicator bandage is applied to said wooden structure to supply said wood preserving chemical to said wooden structure, the plurality of reservoirs being arranged on the flexible matrix in an array of columns and rows, the rows extending the length of the applicator bandage, with the reservoirs being sufficiently spaced, to enable said matrix to be shaped to conform to the contour of the wooden structure.

2. The wood preservative applicator bandage in accordance with claim 1 wherein said plurailty of reservoirs are closed on a side of the matrix not intended to directly contact the wooden structure.

3. A wood preservative applicator bandage as claimed in claim 2 wherein said reservoirs are collapsible under applied pressure so as to maintain the solid tablet in contact with the wooden structure as said wood preserving chemical is consumed.

4. A wood preservative applicator bandage as claimed in claim 3 wherein said applicator bandage is applied to the wooden structure below ground level and the applied pressure is caused by backfill soil.

5. A wood preservative applicator bandage as claimed in claim 2 wherein the wood preserving chemical is stored within said reservoir such that damage to any one reservoir results in loss of chemical from the damaged reservoir only.

6. A wood preservative applicator bandage as claimed in claim 1 wherein said wood preserving chemical is a water soluble or diffusible fungicide or insecticide.

7. A wood preservative applicator bandage as claimed in claim 6, wherein said wood preserving chemical includes at least one compound selected from the group consisting of a boron compound with a fluoride compound and a boron compound without a fluoride compound.

8. A wood preservative applicator bandage as claimed in claim 1 further comprising fastening means for securing said matrix in position on said wooden structure.

9. A wood preservative applicator bandage as claimed in claim 8, wherein said fastening means includes means operable to provide a substantially watertight seal between an upper edge of said applicator bandage and said wooden structure when said applicator bandage is applied to said wooden structure.

10. A wood preservative applicator bandage as claimed in claim 1 wherein said matrix is a thermoplastic material.

11. A wood preservative applicator bandage as claimed in claim 1 wherein the wood preserving chemical to be supplied to the surface of the wooden structure in the form of a solid tablet is retained within the reservoir thereby limiting downward movement of said chemical when the applicator bandage is in position on the wooden structure.

12. A wood preservative applicator bandage for a wooden structure comprising:

a flexible matrix having a surface for contact with the wooden structure, said flexible matrix having formed therein a plurality of individual reservoirs, one or more of said reservoirs each containing a solid tablet solidified within said one or more reservoirs, said solid tablet comprising at least one wood preserving chemical and contacting directly the wooden structure when said applicator bandage is applied to said wooden structure, to supply said wood preserving chemical to said wooden structure, the plurality of reservoirs being arranged on the flexible matrix which includes lines of weakness to allow the matrix to be shaped to the contour of the wooden structure.

13. The wood preservative applicator bandage of claim 12, wherein said reservoirs are collapsible under applied pressure so as to maintain the solid tablet therein in contact with the wooden structure as said wood preserving chemical is consumed.

14. The wood preservative applicator bandage of claim 13, wherein the applicator bandage is applied to the wooden structure below ground level and the applied pressure is caused by backfill soil.

15. The wood preservative applicator bandage of claim 12, wherein the wood preserving chemical to be supplied to the surface of the wooden structure in the form of a solid tablet is retained within the reservoir, thereby limiting downward movement of said chemical when the applicator bandage is in position on the wooden structure.

16. The wood preservative applicator bandage of claim 12, wherein the plurality of reservoirs are arranged in an array of columns and rows, the rows extending along the length of the bandage.

17. The wood preservative applicator bandage of claim 12, wherein said wood preserving chemical is a water-soluble, diffusible fungicide or insecticide including at least one compound selected from the group consisting of a boron compound with a fluorine compound and a boron compound without a fluorine compound.

18. A wood preservative applicator bandage for a wooden structure, comprising:

a flexible matrix having a surface for contact with the wooden structure, said flexible matrix having formed therein a plurality of individual reservoirs, one or more of said reservoirs each containing a solid tablet solidified within said one or more reservoirs, said solid tablet comprising at least one wood preserving chemical contacting directly the wooden structure when said applicator bandage is applied to said wooden structure, to supply said wood preserving chemical to said wooden structure, the plurality of reservoirs being arranged on the flexible matrix to enable said matrix to be shaped to conform to the contour of the wooden structure, said applicator bandage further comprising a fastening means for securing said matrix in position on said wooden structure, comprising a line of indentations formed in the matrix above and below the plurality of reservoirs, said line of indentations extending from the first end of said matrix to a second end of said matrix, said indentations forming male members on one surface of the matrix and corresponding female members on the opposite surface of the matrix such that when the applicator bandage is positioned around the wooden structure, the first end of said matrix overlaps with the second end and the male members of the first end cooperate with the female members of the second end to secure the applicator bandage in position.

19. The wood preservative applicator bandage of claim 18, wherein said fastening means includes means operable to provide a substantially water-tight seal between an upper edge of said applicator bandage and said wooden structure when said applicator bandage is applied to said wooden structure.

* * * * *